(12) United States Patent
Nakashimo

(10) Patent No.: US 7,589,502 B2
(45) Date of Patent: Sep. 15, 2009

(54) CHARGE AND DISCHARGE CONTROL CIRCUIT WITH VARIABLE SWITCHING DELAY TIME FUNCTION AND CHARGING-TYPE SUPPLY DEVICE USING THE CONTROL CIRCUIT

(75) Inventor: Takao Nakashimo, Chiba (JP)

(73) Assignee: Seiko Instruments Inc., Chiba (JP)

( * ) Notice: Subject to any disclaimer, the term of this patent is extended or adjusted under 35 U.S.C. 154(b) by 354 days.

(21) Appl. No.: 11/651,736

(22) Filed: Jan. 10, 2007

(65) Prior Publication Data
US 2007/0188142 A1      Aug. 16, 2007

(30) Foreign Application Priority Data
Jan. 18, 2006    (JP)    .............. 2006-009904

(51) Int. Cl.
*H01M 10/46*    (2006.01)
(52) U.S. Cl. ............................................. 320/134
(58) Field of Classification Search ......... 320/107, 320/128, 134, 136
See application file for complete search history.

(56) References Cited

U.S. PATENT DOCUMENTS 3,889,172 A * 6/1975 Lelaidier et al. ............ 320/156
5,166,595 A * 11/1992 Leverich ..................... 320/139

FOREIGN PATENT DOCUMENTS

JP         H04-075430         3/1992

* cited by examiner

*Primary Examiner*—Edward Tso
(74) *Attorney, Agent, or Firm*—Brinks Hofer Gilson & Lione

(57) ABSTRACT

A charging and discharging control circuit is provided in which a delay circuit is built in an over-discharge detector circuit, an over-charge detector circuit, or the like. A delay time of the detector circuit can be changed from an external without adding a control terminal, thereby reducing a test time of the detector circuit. A voltage detector circuit is disposed between a power supply terminal and a power supply voltage detection terminal of the charging and discharging control circuit, and the voltage detector circuit detects a specified voltage or higher, to thereby shorten the delay time of the internal control circuit.

4 Claims, 4 Drawing Sheets

CHARGE AND DISCHARGE CONTROL CIRCUIT WITH VARIABLE SWITCHING DELAY TIME FUNCTION AND CHARGING-TYPE SUPPLY DEVICE USING THE CONTROL CIRCUIT

This application claims priority under 35 U.S.C. §119 to Japanese Patent Application No. JP2006-009904 filed Jan. 18, 2006, the entire content of which is hereby incorporated by reference.

BACKGROUND OF THE INVENTION

1. Field of the Invention

The present invention relates to a charging and discharging control circuit and a charging type power supply device, and more particularly, to a technique for reducing the amount of time required to perform a test on the charging and discharging control circuit and the charging-type power supply device.

2. Description of the Related Art

As a conventional charging type power supply device that is formed of a secondary battery, there has been known a power supply device as shown in a circuit block diagram of FIG. 2 (for example, refer to JP 04-75430 A). That is, a secondary battery 101 is connected to external terminals −V0 and +V0 through a switch circuit 102. Further, a charging and discharging control circuit 110 is connected in parallel to the secondary battery 101. The function of the charging and discharging control circuit 110 is to detect a voltage across the secondary battery 101. In a case where the secondary battery 101 is in an over-charging state (a state in which the battery is higher than a given voltage value, hereinafter, called "over-charging protection state") or in an over-discharging state (a state in which the battery is lower than a given voltage value, hereinafter, called "over-discharging protection state"), a signal is outputted from the charging and discharging control circuit 110 so that the switch circuit 102 turns off. Also, it is possible to stop the discharge (over-current control) when an excessive current is caused to flow in a load in such a manner that the switch circuit 102 turns off when the external terminal +V0 reaches a given voltage. Hereinafter, this state is called "over-current protection state." The function of the charging and discharging control circuit is to protect the battery from those states.

The switch circuit 102 can be configured by an element capable of stopping the current in response to an input signal from an FET or the like. Also, there is a case in which, as shown in FIG. 3, a power supply terminal 10 for supplying a voltage to the charging and discharging control circuit 110, and a voltage detection terminal 20 for detecting the voltage across the secondary battery 101 are disposed separately. There is also a case in which the power supply terminal of the charging and discharging control circuit 110 is generally connected with a resistor 200 and a capacitor 210 as a filter so that the power supply variation attributable to the charge and discharge of the secondary battery does not induce a malfunction of the charging and discharging control circuit 110. Even in this case, a power supply terminal 10 is additionally disposed to prevent the current consumption of the charging and discharging control circuit 110 from flowing through the voltage detection terminal 20. As a result, it is possible to prevent an error from occurring in the detection voltage of the charging and discharging control circuit 110 due to the current consumption and the voltage drop that is caused by the resistor 200. The above-mentioned configuration makes it possible to enhance a detection precision for detecting a state of the secondary battery 101.

Also, in the case of controlling the charge and discharge of a lithium ion battery, there is generally employed a structure in which, in order to protect the lithium ion battery from being over-charged, a switch element of the switch circuit is turned off after a given delay time that is given by a delay circuit in a case where it is detected that a terminal voltage is equal to or higher than a given level, thereby prohibiting the charge. As a result, the charge into the secondary battery is controlled so that the over-charging state is surely detected and the secondary battery is prevented from being in the over-charging state, without corresponding to a transitional change in the battery voltage. In the charging and discharging control circuit, a control for detecting the over-discharge and stopping the current supply to a load from the secondary battery, and a control for detecting the over-current from the secondary battery to the load and stopping the current supply to the load from the secondary battery are also conducted in the same manner. The delay circuit is used even in the respective controls for the same reason. For example, in order to control the charge and discharge of the lithium ion battery, a delay time of several milliseconds to several seconds is required.

However, in a case of a charging and discharging control circuit including a delay circuit therein, a terminal that allows a delay time to be changed from an external may not be prepared due to the limit of the number of terminals provided in the circuit. In this case, when the over-charge detection voltage or the over-discharge detection voltage is tested, it takes a time equal to or longer than the delay time in the respective tests to output an output signal. A time equal to or longer than the respective delay times is required to confirm the output signal, to thereby extend the test time of the charging and discharging control circuit, resulting in an increase in the circuit manufacture costs as well as the manufacturing costs of the charging type power supply device using the charging and discharging control circuit.

SUMMARY OF THE INVENTION

In view of the above-mentioned circumstances, the present invention has been made to solve the above-mentioned problems, and therefore, it is an object of the present invention to provide a charging and discharging control circuit in which a voltage detector circuit is disposed between a power supply terminal and a voltage detection terminal, and a test mode of shortening a delay time of an internal control circuit is entered in a case where the voltage detector circuit detects a constant voltage or higher between both terminals having normally substantially the same voltage.

With the above-mentioned structure, the test time of the charging and discharging control circuit is reduced, thereby making it possible to decrease the manufacturing costs.

As described above, the charging and discharging control circuit according to the present invention enters the test mode of reducing the delay time of the internal control circuit without adding a control terminal, thereby obtaining the effect of reducing the test time and decreasing the manufacturing costs.

DETAILED DESCRIPTION OF THE PREFERRED EMBODIMENTS

A description will now be given in more detail of the preferred embodiments of the present invention with reference to the accompanying drawings.

First Embodiment

Figure 1:
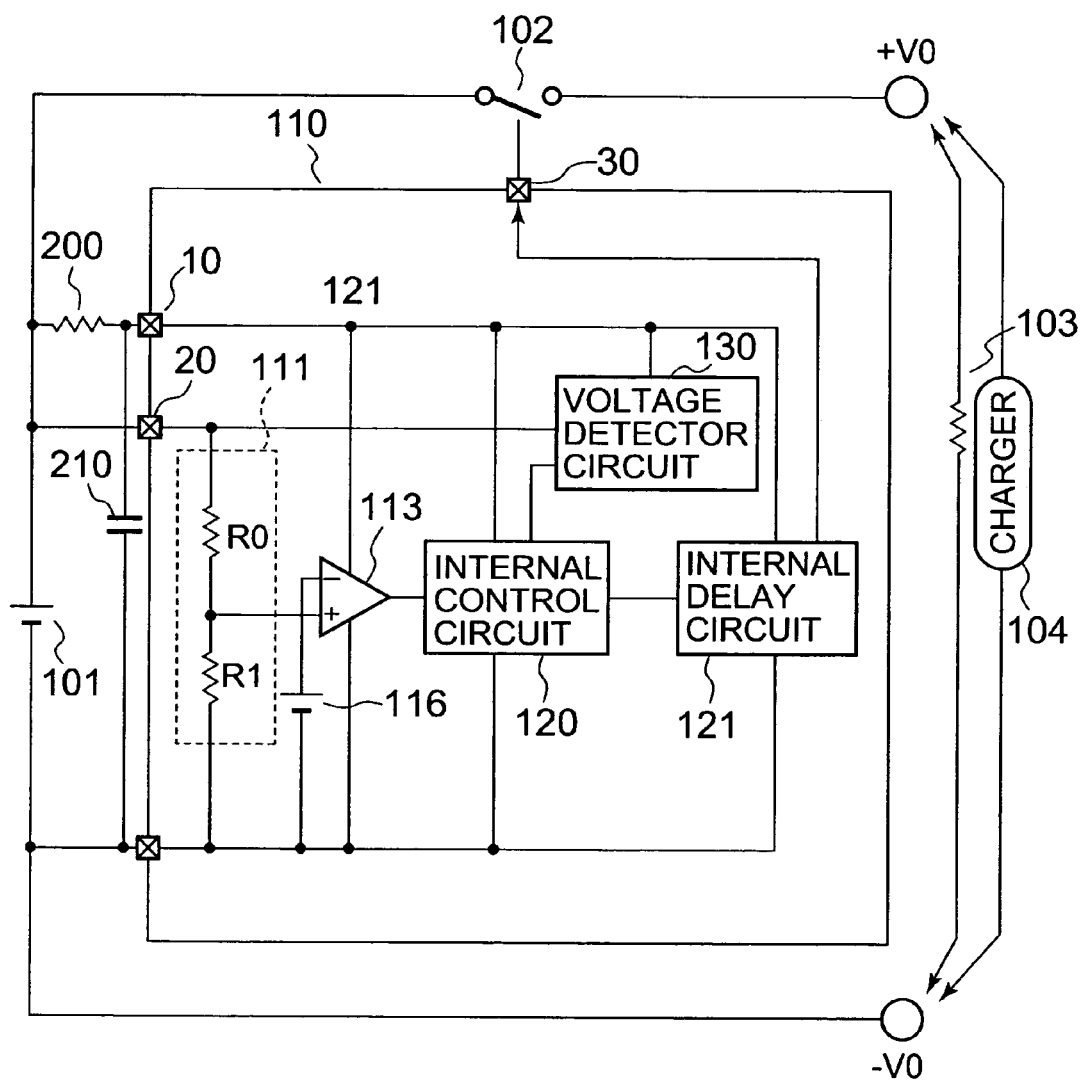
FIG. 1 is a block diagram showing a charging type power supply device including a charging and discharging control circuit according to a first embodiment of the present invention.
Figure 2:
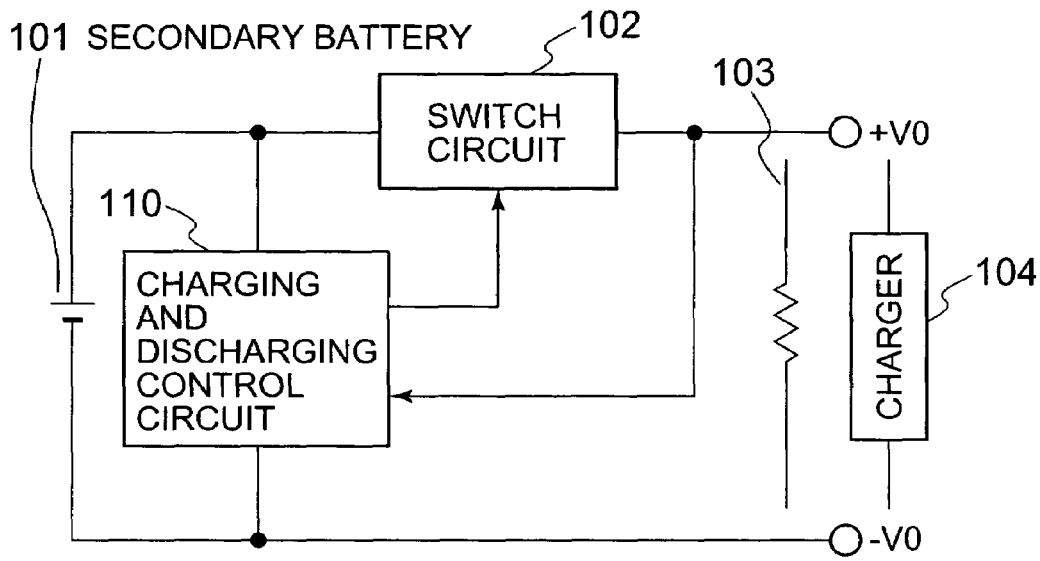
FIG. 2 is a block diagram showing a conventional charging type power supply device.
Figure 3:
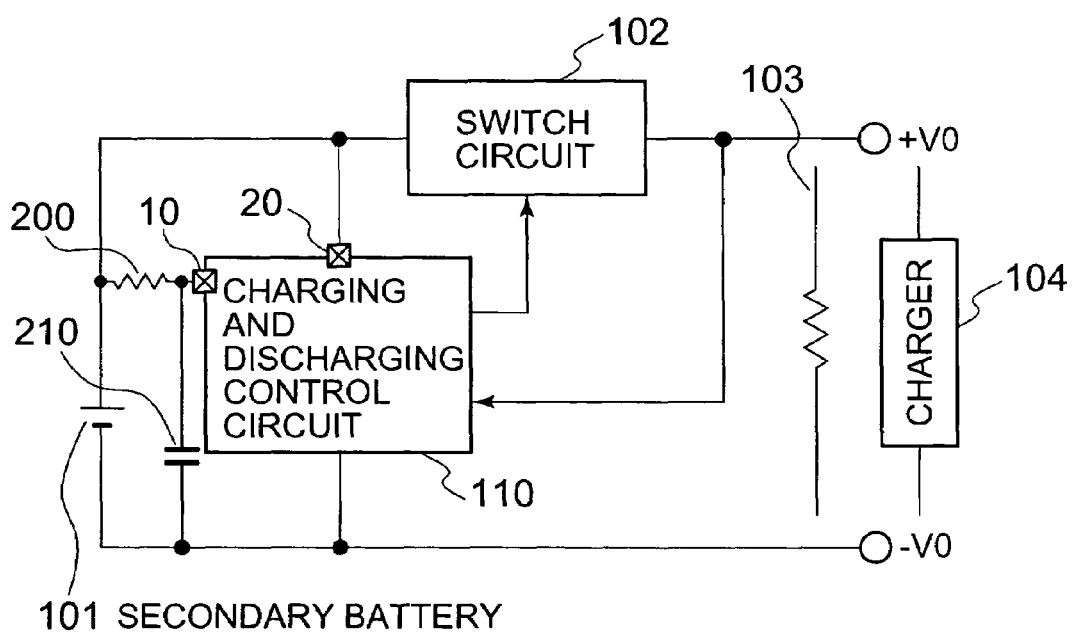
FIG. 3 is a block diagram showing a conventional charging type power supply device.

A first embodiment of the present invention is shown in FIG. 1. FIG. 1 is a block diagram showing a charging type power supply device including a charging and discharging control circuit according to the present invention.

Hereinafter, the first embodiment will be described with reference to FIG. 1. A secondary battery 101 is connected between external power supply terminals +VO and −V0 through a switch circuit 102. A charging and discharging control circuit 110 is connected in parallel to the secondary battery 101. A positive electrode of the secondary battery 101 is connected to a voltage detection terminal 20 of the charging and discharging control circuit 110, and is connected to a power supply terminal 10 through a resistor 200. A capacitor 210 is connected between the power supply terminal 10 and a negative electrode of the secondary battery 101 so that the charging and discharging control circuit 110 is not affected by a malfunction or the like due to the temporary power supply variation of the secondary battery 101.

The charging and discharging control circuit 110 includes an over-charging detection comparator 113, a reference voltage circuit 116 for applying a given reference voltage Vr to an input terminal of the over-charge detection comparator 113, a voltage divider circuit 111 that divides a voltage across the secondary battery 101, an internal control circuit 120, and an internal delay circuit 121. An on/off control terminal of the switch circuit 102 is connected to a switch control terminal 30 of the charging and discharging control circuit 110, and an on/off operation of the switch circuit 102 is controlled according to a detection result of the charging and discharging control circuit 110.

A charger 104 for charging the secondary battery 101 or a load 103 that is driven by the secondary battery 101 is connected between the external power supply terminals +VO and −VO.

The over-charge detection comparator 113 has a function of comparing a voltage division output resulting from dividing the terminal voltage of the secondary battery 101 by resistors R0 and R1 of the voltage divider circuit 111 with a reference voltage Vr of the reference voltage circuit 116 to detect an over-charge state. The over-charge detection comparator 113 has a high-level output when the level of the divided output voltage that is inputted to the positive phase input terminal becomes larger than the reference voltage Vr. The voltage detector circuit 130 monitors a voltage difference between the power supply terminal 10 and the voltage detection terminal 20, and outputs a detection signal to the internal delay circuit 121 in a case where the potential difference between the power supply terminal 10 and the voltage detection terminal 20 becomes equal to or higher than a given voltage. The internal control circuit 120 inputs the outputs of the over-charge detection comparator 113 and the voltage detector circuit 130 as input signals and outputs a signal to the internal delay circuit 121. The internal delay circuit 121 inputs the output of the internal control circuit 120 as an input signal, and outputs a signal for controlling the switch circuit 102 to the switch control terminal 30 after a given delay time.

Figure 4:
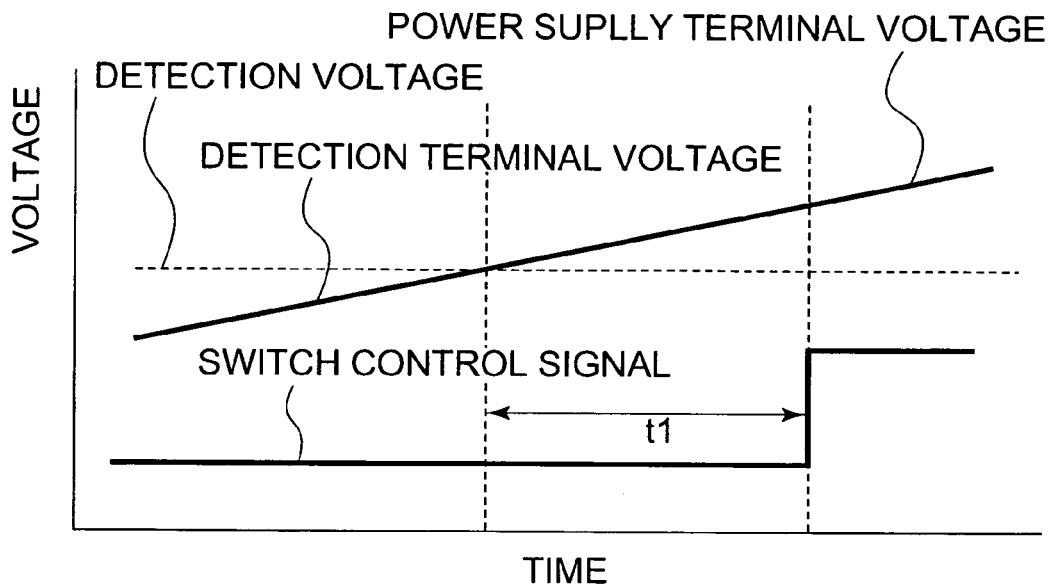
FIG. 4 is a waveform diagram showing an operation of the charging and discharging control circuit.

When the secondary battery 101 is in the over-charge state, the over-charge detection comparator 113 detects the over-charge state, and the internal control circuit 120 outputs a control signal to the internal delay circuit 121. In this situation, when the voltages of the power supply terminal 10 and the voltage detection terminal 20 are substantially equal to each other, the internal delay circuit 121 inputs the output voltage of the over-charge detection comparator 113 as an input signal, and outputs a signal for controlling the switch circuit 102 to the switch control terminal 30 after a delay time t1 that is specified from the viewpoint of the specification as shown in FIG. 4.

Figure 5:
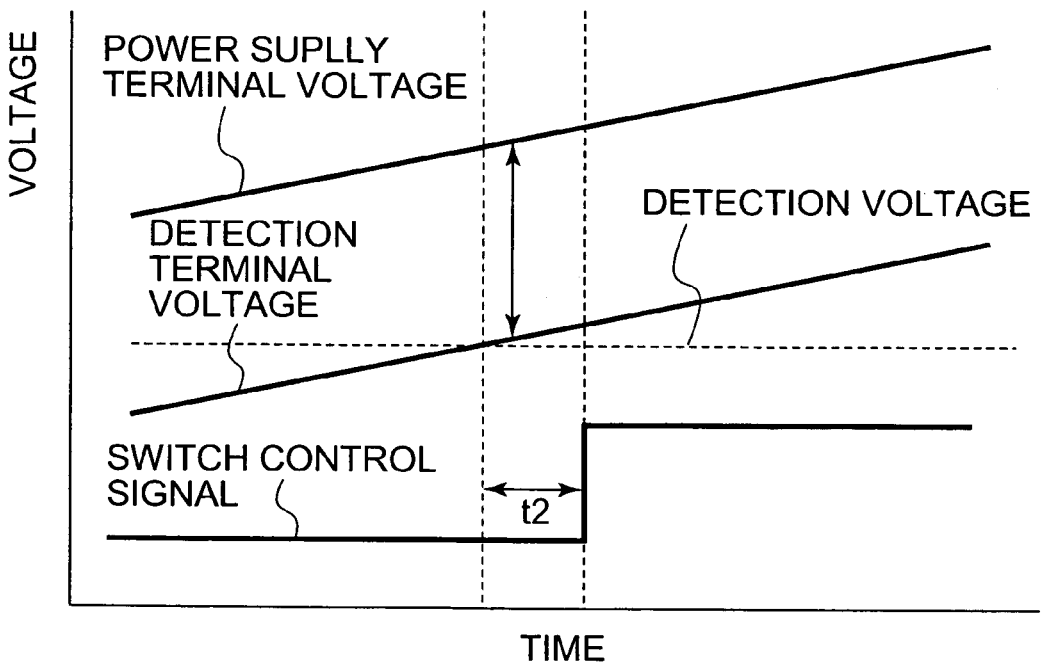
FIG. 5 is a waveform diagram showing the operation of the charging and discharging control circuit according to the first embodiment of the present invention.

Also, the voltage detector circuit 130 outputs a signal to the internal control circuit 120 when the potential difference between the power supply terminal 10 and the power supply detection terminal 20 is equal to or higher than a given voltage. Upon inputting the signal of the voltage detector circuit 130, the internal control circuit 120 outputs a control signal that allows the delay time to be shortened to the internal delay circuit 121. In this situation, when the over-charge detection comparator 113 detects the over-charge state, the internal delay circuit 121 inputs the output voltage of the over-charge detection comparator 113 as an input signal, and outputs a signal for controlling the switch circuit 102 to the switch control terminal 30 after a delay time t2 that is shorter than the delay time t1 that has been specified from the viewpoint of the specification. FIG. 5 shows a signal waveform when the potential difference between the power supply terminal 10 and the power supply detection terminal 20 is equal to or higher than a given voltage.

After that, when the potential difference between the power supply terminal 10 and the power supply detection terminal 20 is decreased to the specified voltage or lower, the voltage detector circuit 130 outputs a control signal that allows the delay time of the internal delay circuit 121 to return to the specified length to the internal control circuit 120, and the internal delay circuit 121 sets the delay time as the normal delay time t1. In normal use, because the voltages at the power supply terminal 10 and the power supply detection terminal 20 are substantially the same potential, there is no case in which the test mode is entered at the normal time.

The block diagram of FIG. 1 shows only the over-charge detector circuit and the peripheral circuit, and the over-discharge detector circuit and the over-current detector circuit can be controlled with the same configuration.

Also, FIG. 5 shows that the voltage at the power supply terminal 10 becomes equal to or higher than the voltage at the power supply detection terminal 20 by the specified voltage or higher, but the circuit may be configured such that the delay time is reduced when the voltage at the power supply detection terminal 20 is equal to or higher than the voltage at the power supply terminal 10 by the specified voltage or higher.

Second Embodiment

Figure 6:
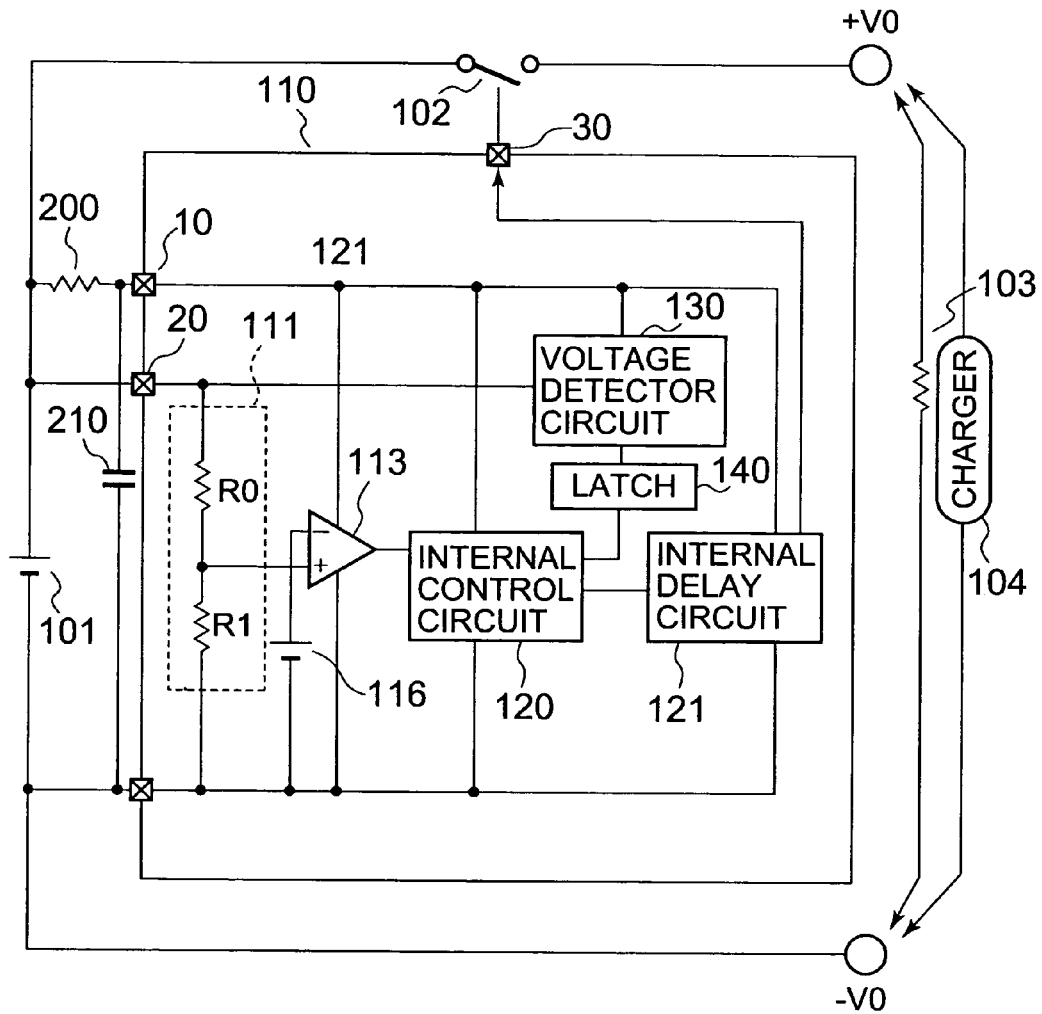
FIG. 6 is a block diagram showing a charging type power supply device including a charging and discharging control circuit according to a second embodiment of the present invention.

FIG. 6 shows a block diagram showing a charging type power supply device including a charging and discharging control circuit according to a second embodiment of the present invention.

A latch circuit 140 is disposed between the voltage detector circuit 130 and the internal control circuit 120 in addition to the charging and discharging control circuit according to the first embodiment. With the above-mentioned configuration, it is possible to change the delay time of the internal delay circuit 121 from t1 to t2 by only temporarily setting the potential difference between the power supply terminal 10 and the power supply detection terminal 20 to the specified voltage or higher in the pulse fashion.

In order to return the delay time of the internal delay circuit 121 from t2 to t1, it is necessary to reset the latch circuit 140. The reset of the latch circuit 140 can be performed by, for example, employing methods of decreasing the supply voltage, inverting a symbol with respect to a symbol obtained when the potential difference between the power supply terminal 10 and the power supply detection terminal 20 is detected, generating a signal that returns the latch circuit 140 by using the fact that the control signal of the current switch circuit 102 is inverted, or the like.

Figure 7:
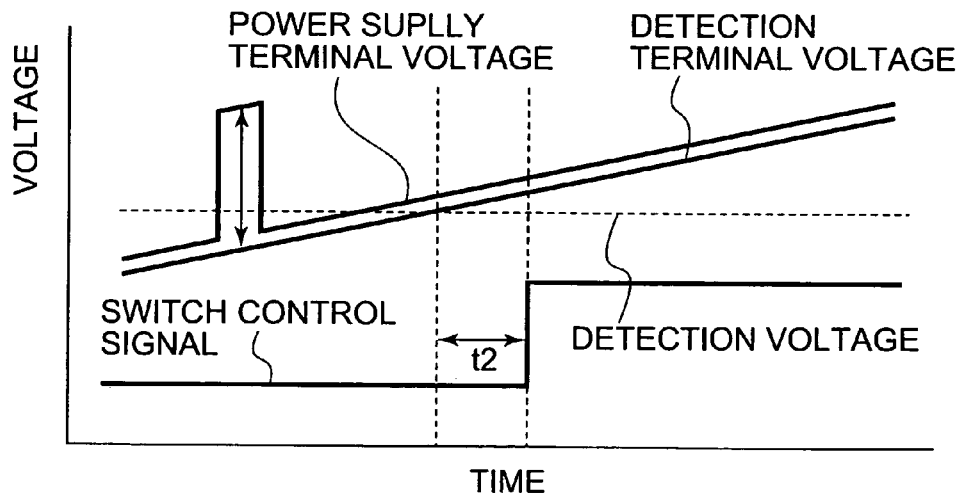
FIG. 7 is a waveform diagram showing the operation of the charging and discharging control circuit according to the second embodiment of the present invention.

Also, FIG. 7 shows that the voltage at the power supply terminal 10 becomes equal to or higher than the voltage at the power supply detection terminal 20 by the specified voltage or higher, but the circuit can be configured such that the delay time is reduced when the voltage at the power supply detection terminal 20 is equal to or higher than the voltage at the power supply terminal 10 by the specified voltage or higher.

What is claimed is:

1. A charging and discharging control circuit, comprising:
    a power supply terminal for inputting a voltage of a secondary battery as a power supply;
    a voltage detection terminal for inputting the voltage of the secondary battery for detection;
    a voltage divider circuit for dividing a voltage of the voltage detection terminal;
    a reference voltage circuit;
    a voltage comparator circuit for comparing an output of the voltage divider circuit with an output of the reference voltage circuit;
    a voltage detector circuit for detecting the voltage of the voltage detection terminal;
    an internal control circuit for inputting an output signal of the voltage comparator circuit and an output signal of the voltage detector circuit to output a detection signal; and
    a delay circuit for delaying the detection signal to output a switch control signal,
    wherein a delay time of the delay circuit is shortened when the voltage detector circuit detects that the voltage of the voltage detection terminal is equal to or higher than a predetermined voltage.

2. A charging and discharging control circuit according to claim 1, wherein the voltage comparator circuit comprises a circuit for detecting an over-discharge state of the secondary battery.

3. A charging and discharging control circuit according to claim 1, wherein the voltage comparator circuit comprises a circuit for detecting an over-charge state of the secondary battery.

4. A charging type power supply device, comprising:
    an external terminal connected to one of a charger and a load;
    a secondary battery connected to the external terminal through a switch circuit; and
    the charging and discharging control circuit according to claim 1 for connecting the secondary battery with the power supply terminal and the voltage detection terminal, and connecting the switch circuit with the switch control signal output terminal.

* * * * *